US008330954B2

(12) United States Patent
Govyadinov et al.

(10) Patent No.: US 8,330,954 B2
(45) Date of Patent: Dec. 11, 2012

(54) LIGHT SCATTERING AEROSOL DETECT DEVICE

(75) Inventors: Alexander Govyadinov, Corvallis, OR (US); Paul A. Richards, Corvallis, OR (US); Tommy D. Deskins, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 12/817,752

(22) Filed: Jun. 17, 2010

(65) Prior Publication Data

US 2011/0310385 A1 Dec. 22, 2011

(51) Int. Cl.
*G01N 21/00* (2006.01)

(52) U.S. Cl. ........................................ 356/338; 356/337

(58) Field of Classification Search ........... 356/337–343
See application file for complete search history.

(56) References Cited

U.S. PATENT DOCUMENTS

| | | | | | |
|---|---|---|---|---|---|
| 4,597,666 | A * | 7/1986 | Gerber et al. | ................. | 356/338 |
| 4,761,074 | A * | 8/1988 | Kohsaka et al. | ................. | 356/37 |
| 2008/0257072 | A1 * | 10/2008 | Takahashi et al. | ......... | 73/864.11 |
| 2009/0115812 | A1 * | 5/2009 | Ito et al. | .......................... | 347/19 |

* cited by examiner

*Primary Examiner* — Tri T Ton
(74) *Attorney, Agent, or Firm* — Steven L. Webb

(57) ABSTRACT

One aspect is an aerosol detection arrangement including a light source for projecting a light beam. The arrangement includes a light collector configured to collect light scattered off liquid drops in an aerosol that enter the light beam and processing the scattered light into an output signal. The arrangement includes a controller for receiving the output signal from the light collector and uses the output signal to determine a predicted number of main liquid drops ejected.

17 Claims, 6 Drawing Sheets

LIGHT SCATTERING AEROSOL DETECT DEVICE

BACKGROUND

In some applications, aerosol detection devices are utilized to detect aerosol ejected by ejector nozzles. Based on the detection of aerosol, the status of a particular nozzle or groups of nozzles can be diagnosed.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
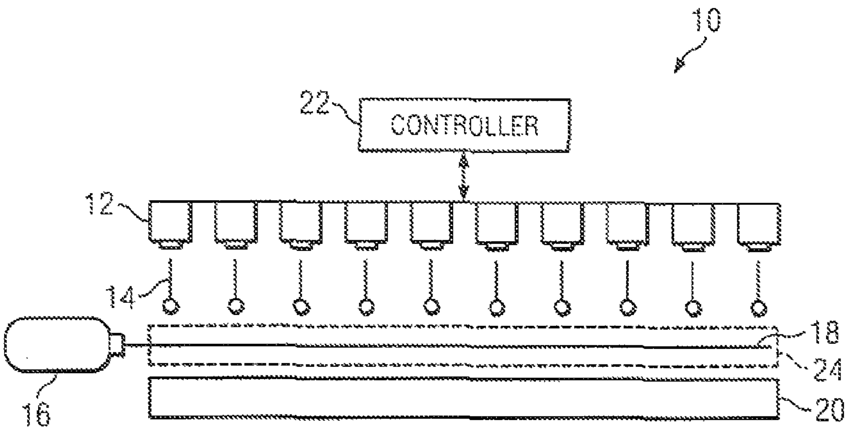
FIG. 1 is a drop and aerosol detector arrangement in accordance with one embodiment.

FIG. 1 illustrates a drop and aerosol detector arrangement 10 in accordance with one embodiment. In one embodiment, drop and aerosol arrangement 10 includes a plurality of drop ejectors 12, each configured to dispense a liquid droplet 14. Arrangement 10 further includes a light source 16, which emits a light beam 18. Arrangement 10 also includes service station 20, controller 22, and light collector 24. In operation of one embodiment, drop detector arrangement 10 is configured for use in a variety of applications where the controlled ejection of liquid droplets is to be monitored.

For example, in one application ink drops are deposited on print media in a print engine for an inkjet printer. In such an application, drop arrangement 10 may be used to monitor the ejection of ink. In other applications, drop arrangement 10 may be used to monitor the ejection of liquid in biochemical tests, diagnostic strips or device coating applications.

In one embodiment, controller 22 is configured to control the plurality of drop ejectors 12 such that liquid droplets 14 are controllably ejected to service station 20. In one embodiment, print media is received adjacent service station 20 such that liquid droplets 14 are controllably deposited on the print media.

In one embodiment, light source 16 is configured to project light beam 18 between the plurality of drop ejectors 12 and service station 20. As such, when liquid droplets 14 are ejected from drop ejectors 12, liquid droplets 14 pass through light beam 18 as they drop to service station 20. In various embodiments, light source 16 may be a collimated source, such as a laser source, or an LED.

As a liquid droplet 14 passes through light beam 18, light from light beam 18 is scattered in various directions. Light collector 24 is illustrated adjacent light beam 18 and some of the scattered light will enter light collector 24. Light collector 24 is illustrated in dotted lines in FIG. 1, because it is "behind" light beam 18 in the particular orientation in the figure.

In one embodiment, light collected into light collector 24 from the light scattering that occurred when liquid droplet 14 passed through light beam 18 can be used to measure the effectiveness or status of liquid droplet 14 from one or more of ejectors 12. For example, if controller 22 directs one particular drop ejector to eject a liquid droplet 14 at a particular point in time, corresponding light scattering from liquid droplet 14 passing through light beam 18 should enter light collector 24. By monitoring the collected light and correlating it with control signals from controller 22, a determination can be made as to whether a liquid droplet 14 did in fact eject, as well as determinations about the size, velocity and quality of liquid droplet 14.

When controller 22 directs one or more drop ejector to eject a liquid droplet 14, smaller droplets may also be inadvertently ejected or formed by the drop ejector. These smaller droplets may form an aerosol or mist that drifts away from the drop ejectors. In some cases, for example when the drop ejector is clogged or damaged, only the smaller droplets may be formed.

In one embodiment, light collector 24 includes a light detector. In one embodiment, a first end of light collector 24 is located adjacent light source 16 and the light detector is located at a second end of light collector 24, which is opposite the first end. In one example, the light detector is coupled to controller 22, which is configured to process light signals that are collected in light collector 24 and then coupled into the light detector. In one example, a separate controller from controller 22 may be used to process the collected light signals.

Figure 2A:
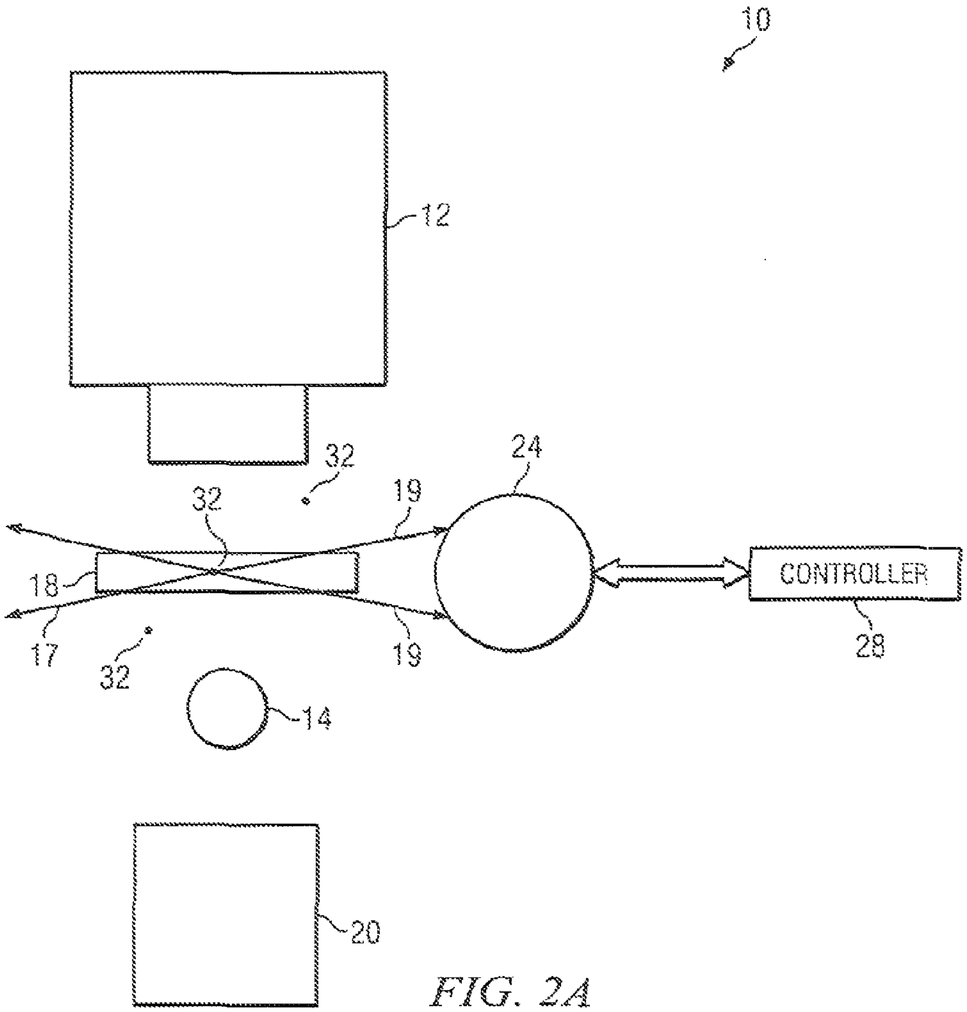
FIG. 2A illustrates a cross-sectional view of a drop and aerosol detector arrangement in accordance with one embodiment.

FIG. 2A illustrates a cross-sectional view of drop and aerosol arrangement 10 in accordance with one embodiment. In FIG. 2A, a drop ejector 12 is illustrated above service station 20. A light beam 18 is illustrated between drop ejector 12 and service station 20 and liquid droplet 14 is illustrated as already having passed through light beam 18. Light collector 24 is illustrated adjacent light beam 18 and positioned vertically in the figure between drop ejector 12 and service station 20. A number of smaller droplets 32 are shown drifting between droplet ejector 12 and service station 20. One of the smaller droplets 32 is in light beam 18.

In one embodiment, light source 16 is a collimated light source such as a laser source or similar device. In various embodiments, the shape of light beam 18 is circular, elliptical, rectangular (as illustrated in FIG. 2A) or other shape. As the main droplet 14 and the smaller liquid droplets 32 pass through light beam 18, light is scattered in various directions (17, 19).

As illustrated in the embodiment, as the main droplet 14 and the smaller liquid droplets 32 pass through light beam 18, scattered light 17 and 19 is deflected in various orientations. Light will scatter in many directions, but for ease of illustration just a few examples are shown. Some scattered light 17 is directed away from light collector 24, while some scattered light 19 is directed into light collector 24. In one embodiment, light collector 24 is configured to collect scattered light 19 and to direct it to the light detector and controller 28 for further processing.

In one embodiment, light collector 24 is a tubular-shaped light pipe that is configured to be adjacent each of a series of drop ejector nozzles 12. As such, as each nozzle 12 ejects liquid droplets (14 and 32) through light beam 18, scattered light 19 is collected all along the length of light collector 24. In this way, only a single collector 24 is needed to collect scattered, light 19 from a plurality of drop ejectors 12 located along its length. Collector 24 then propagates all of this collected scattered light 19 from the various liquid droplets 14 and 32 to the light detector and controller 28 for further processing.

In one embodiment, light collector 24 is configured with grating or a pitch that is angled to deflect most of scattered light 19 toward a light detector coupled to controller 28. In one embodiment, the light detector includes a photo detector, or similar sensor of light or other electromagnetic energy capable of detecting scattered light 19 from the different droplets (14 and 32) passing through light beam 18. In one embodiment, the light detector includes a charge-coupled device (CCD) or CMOS array having a plurality of cells that provide sensing functions. The CCD or CMOS array by means of the plurality of cells detects the light in its various intensities. In one embodiment, the light detector receives scattered light 19 and generates an electrical signal that is representative of the scattered light 19 for processing by controller 28.

Figure 2B:
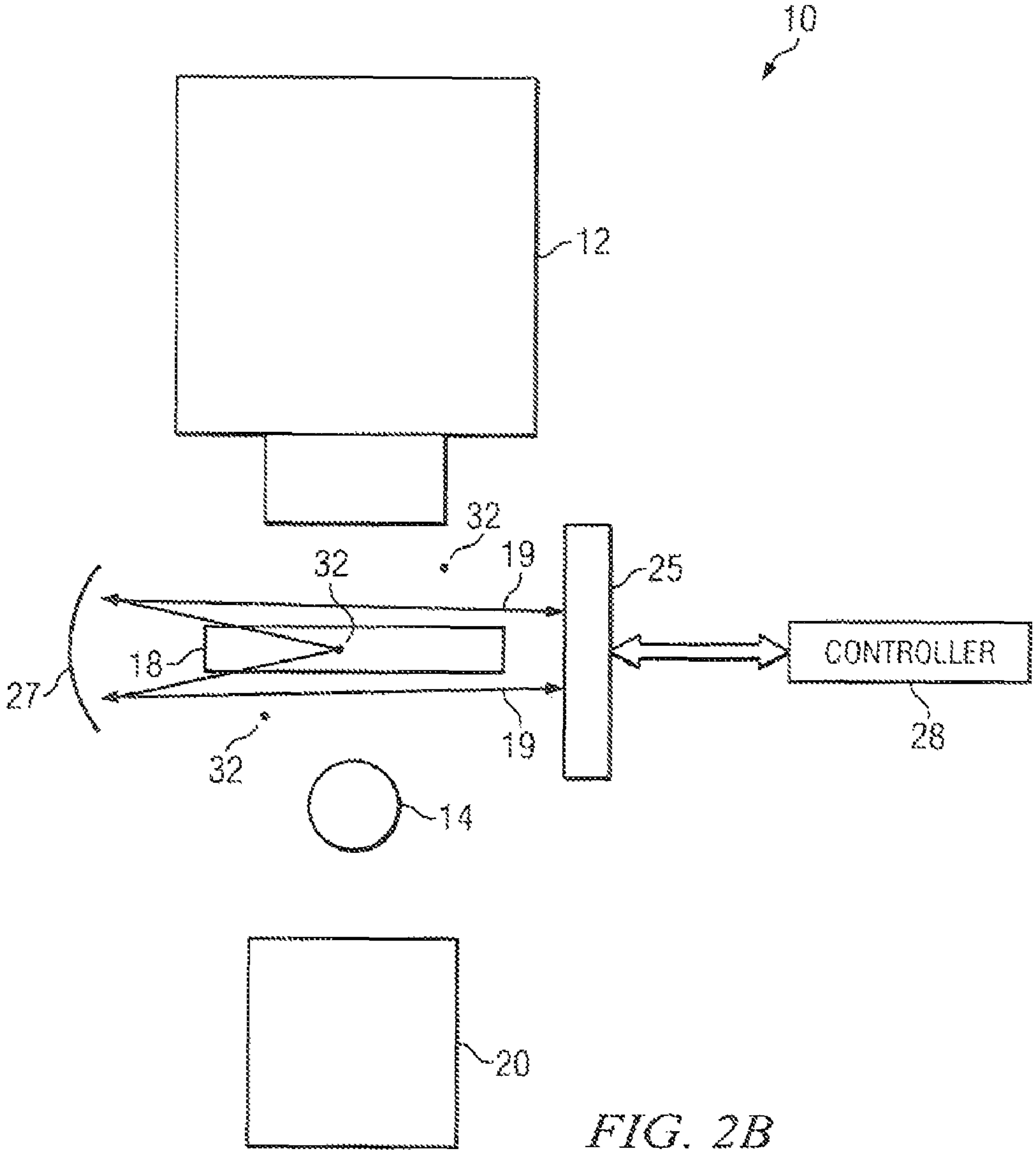
FIG. 2B illustrates a cross-sectional view of a drop and aerosol detector arrangement in accordance with another embodiment.

FIG. 2B illustrates a cross-sectional view of drop and aerosol arrangement 10 in accordance with one alternative embodiment. FIG. 2B is similar to FIG. 2A such that a drop ejector 12 is illustrated above service station 20, a light beam 18 is illustrated between drop ejector 12 and service station 20 and liquid droplets 14 and 32 are illustrated passing through light beam 18. As an alternative to light collector 24 in FIG. 2A, FIG. 2B illustrated light collector 25 and light deflection device 27. The light deflection device 27 can be a lens, a mirror or the like capable of directing the light scattered off of droplet 32 to light collector 25, which includes a light detector that receives scattered light 19 and generates an electrical signal that is representative of the scattered light 19 for processing by controller 28.

In an embodiment, light collector 25 may include a photo detector or may be a photo detector array such as CCD, CMOS or even Avalanche Photo Diode (APD). Typically the CCD array may have a plurality of cells that provide the sensing functions. The CCD array, by means of the plurality of cells, detects the light in its various intensities. Each liquid droplet is identified from the detected light intensity of a group of one or more cells of the CCD array.

Similar to light collector 24 in FIG. 2A, based on the various light intensities collected at light collector 24, droplet characteristics, such as the presence and/or absence of drops, the size of the drops, and the falling angle and speed of the drops are determined. Accordingly, the controller 28 associated with light collector 25 may determine the status of the drop ejectors 12 based on the characteristics of the liquid droplets (14 and 32), or may determine the characteristics of droplets 14 themselves.

Figure 3A:
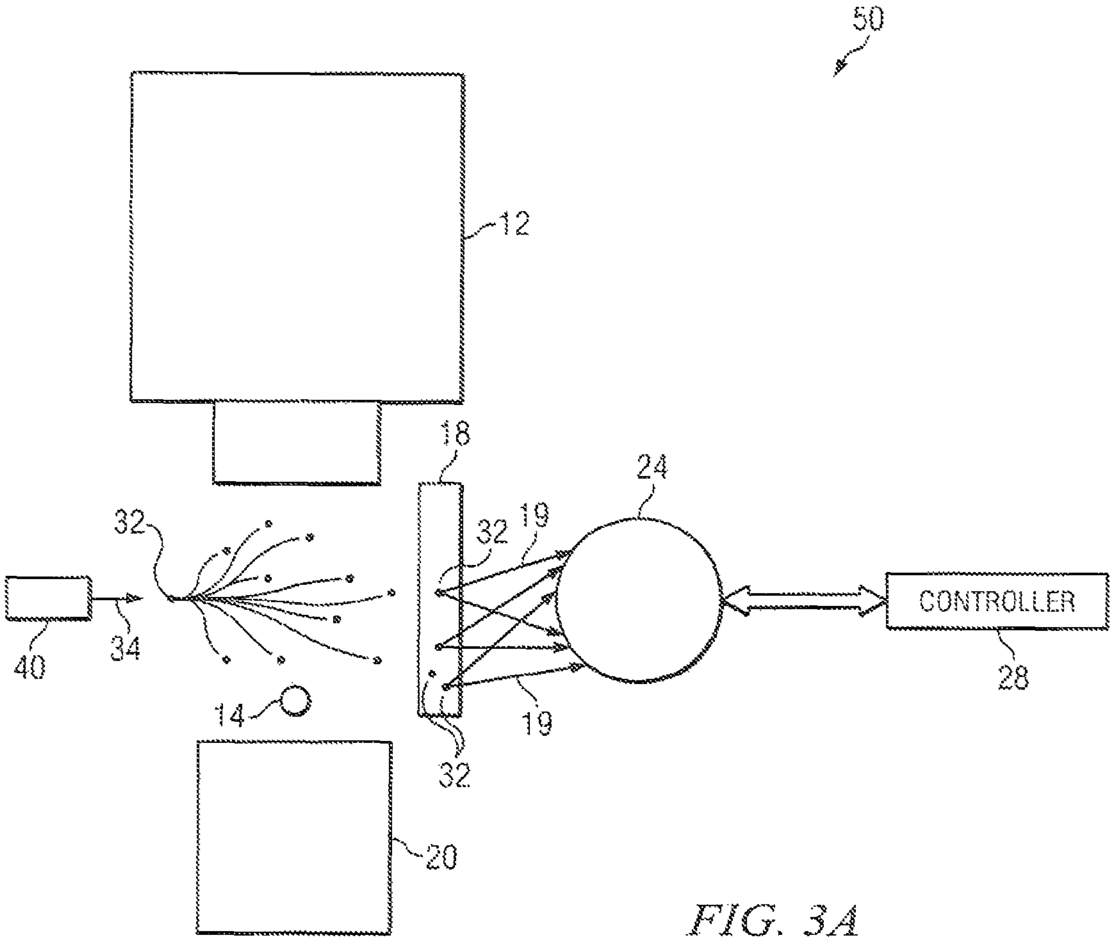
FIG. 3A illustrates a cross-sectional view of an aerosol detector arrangement in accordance with one embodiment.

FIG. 3A illustrates a cross-sectional view of aerosol detector arrangement 50 in accordance with one embodiment. FIG. 3A is similar to FIGS. 2A and 2B such that a drop ejector 12 is illustrated above service station 20. Unlike FIGS. 2A and 2B the light beam 18 is illustrated adjacent one side of drop ejector 12 and service station 20. In this arrangement main liquid droplet 14 will not pass through light beam. Smaller liquid droplets 32 that form an aerosol may drift into light beam 18 as shown. Light hitting droplets 32 in light beam 18 will be directed into light collector 24. In some embodiments there may be two light beams, one on either side of drop ejector 12 and service station 20. FIG. 3A also includes airflow device 40 positioned between drop ejector 12 and service station 20 and configured to create an air flow in the direction of light beam 18 (as shown by arrow 34). Air flowing towards light beam 18 moves smaller droplets 32 into and through light beam 18. Light scattering from smaller droplets 32 will be collected by light collector 24.

Figure 3B:
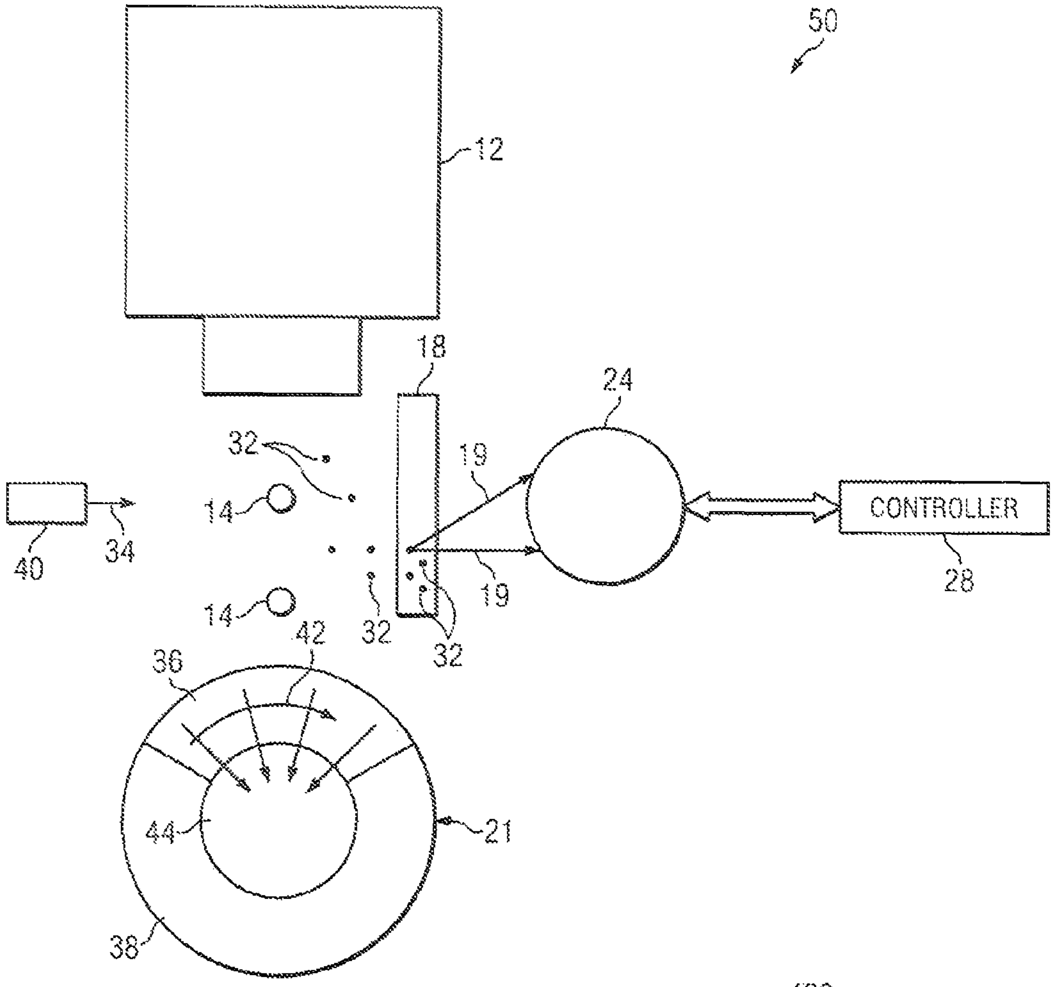
FIG. 3B illustrates a cross-sectional view of an aerosol detector arrangement in accordance with another embodiment.

FIG. 3B illustrates a cross-sectional view of aerosol detector arrangement 50 in accordance with one alternative embodiment. FIG. 3B is similar to FIG. 3A but service station 20 has been replaced by rotating drum 21. Drop ejector 12 is illustrated above rotating drum 21, and a light beam is adjacent drop ejector 12 and rotating drum 21. FIG. 3B also includes airflow device 40 positioned between drop ejector 12 and rotating drum 21 and configured to create an air flow in the direction of light beam 18 (as shown by arrow 34). Rotating drum carries a substrate (not show) past drop ejector 12. In some embodiments rotating drum may pull a vacuum (as shown by arrows 44) to hold a substrate onto the drum surface. In some embodiments, rotating drum may pull a vacuum in only one segment of rotating drum, for example segment 36. Rotating drum rotates in the direction shown by arrow 42. Airflow created by rotating drum may push the smaller droplets 32 into light beam.

Airflow device 40 accelerates the aerosol movement to the light beam 18. In some embodiments airflow device 40 is an active device. One example of an active airflow device is a duct with a plurality of openings that direct higher pressure air from inside the duct towards light beam 18 perpendicular to the path of the main liquid drop. Other types of active airflow devices are possible, for example a suction device placed near the light collector 24. The speed of the air flowing towards the light beam can be adjusted. Even slow air speeds of 10 mm/sec help to move the aerosol to the detector, thereby increasing the output signal of the detector. A mid range air speed of around 150+/−100 ft/min seems to move most of the particles in the aerosol into the light beam 18. At high air speeds of 1300 ft/min the time the particles remain in the light beam is reduced and the air flow may begin breaking off particles from the main liquid drop. In one embodiment airflow speed will be between zero and 1200 ft/min.

In other embodiments airflow device 40 may be a passive device that is shaped to direct airflow created by the rotating drum or the moving media towards light beam 18. In the arrangement shown in FIG. 3B main liquid droplet 14 will not pass through light beam and light beam will only be used to measure the smaller droplets 32 in the aerosol.

Figure 4:
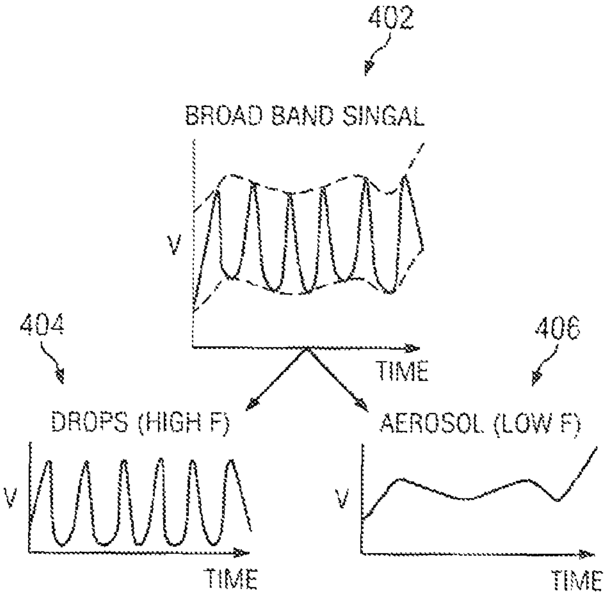
FIG. 4 illustrates an output signal representative of scattered light collected in a drop and aerosol arrangement in accordance with one embodiment.

As evident from FIGS. 2 and 3, there are alternative mechanisms for an aerosol arrangement to collect scattered light and process it for analysis in accordance with embodiments. FIG. 4, illustrates an output signal representative of scattered light 19 collected in a drop and aerosol arrangement 10. The output signal shown in graph 402 is a broad band signal and contains information about the main fluid drops as well as the smaller drops that form the aerosol. The main fluid drops 14 are larger in size and drop quickly through the light beam creating high frequency high intensity peaks in the output signal. The smaller drops 32 that form the aerosol slowly pass through the light beam with a smaller amount of scattered light forming a low frequency lower intensity signal. The output signal shown in graph 404 is a high frequency signal derived from broad band signal 402. The signal in graph 404 can be derived from signal 402 by using a low frequency filter. The output signal shown in graph 406 is a low frequency signal derived from broad band signal 402. The signal in graph 406 can be derived from signal 402 by using a high frequency filter. In another embodiment low frequency signal can be created by pulsing light beam 18 such that the light beam is off when main liquid drop 14 would be passing through light beam 18. Each of the three graphs show a voltage on the vertical axis corresponding to the amount of light detected. The horizontal axis is time. In the illustrated example, a drop detection of a plurality of nozzle firing drops at a high frequency is shown.

In the broad band and high frequency graphs (402 and 404), the signal has a plurality of voltage peaks over time. Each of these peaks represents a peak amount of scattered light 19 collected and processed by controller 28 due to a main liquid droplet 14 as it passed through light beam 18. In the broad band and low frequency graph (402 and 406) there is a slow accumulation of a voltage offset over time. The slow accumulation of voltage over time corresponds to a slow accumulation of smaller particles 32 in light beam 18. Fast Fourier Transform (FFT) or any other signal processing technique can be used to extract the low frequency aerosol signal 406 and the high frequency signal 404 from the broadband signal 402.

In one embodiment, controller 22 controls the plurality of drop ejectors 12 such that each is configured to dispense a liquid droplet 14 at a specified time. As such, each corresponding liquid droplet 14 passes though light beam 18 at a known time, and the corresponding collected scattered light 19 produces a peak in the output signal that can be correlated by controller 28 in order to verify a liquid droplet 14 was indeed produced. When drop and aerosol arrangement 10 is used to measure the aerosol produced by ejectors 12, the high frequency content of the response that corresponds to the main liquid drops may not be used.

Figure 5:
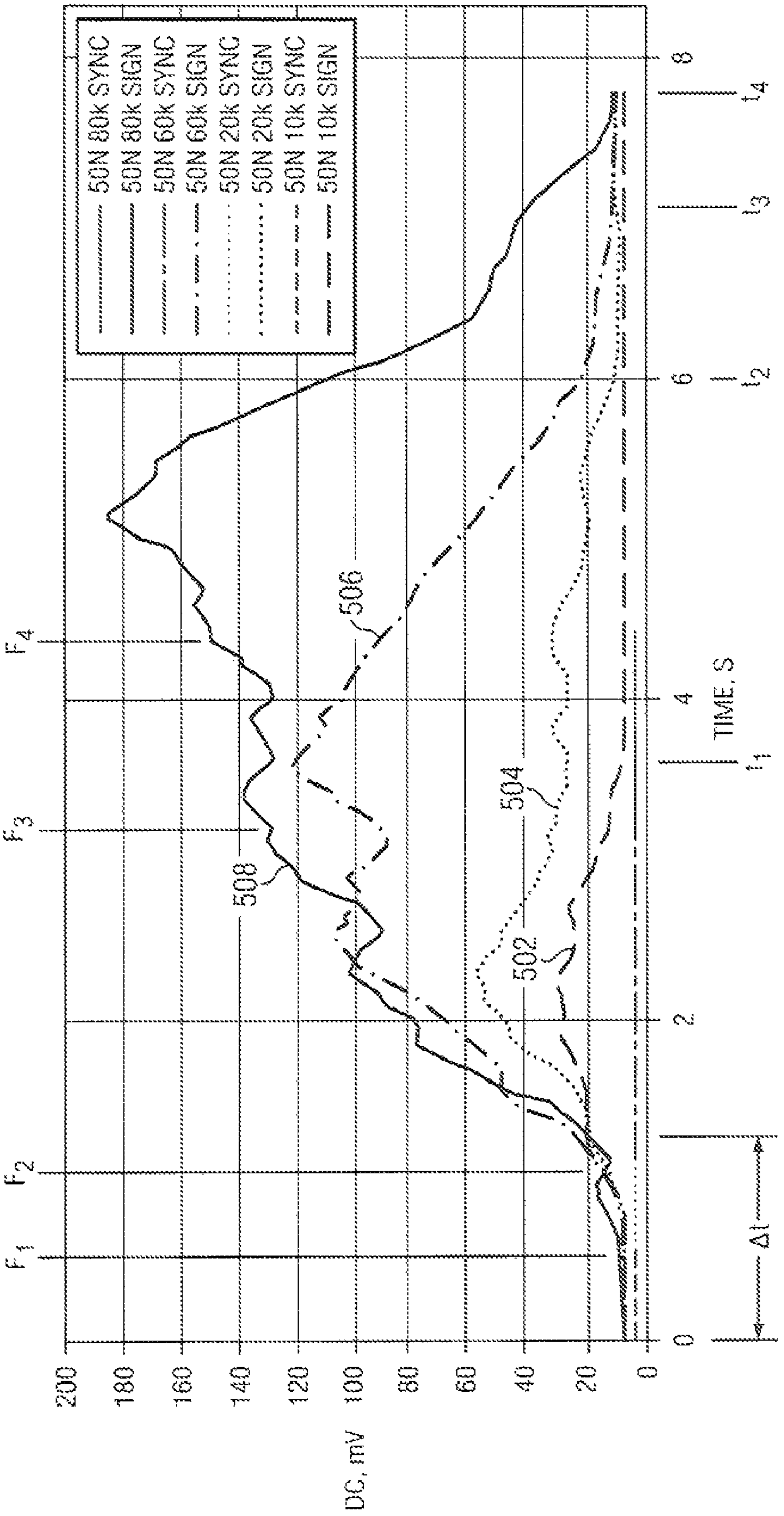
FIG. 5 illustrates output signals representative of scattered light collected in an aerosol arrangement as shown in FIG. 3A in accordance with one embodiment.

FIG. 5 illustrates output signals representative of scattered light 19 collected in an aerosol arrangement 50 as shown in FIGS. 3A and 3B. Because the main liquid drops 14 do not pass through the light beam in aerosol arrangement 50 there is no high frequency peaks in the output signal. The output signals shown in FIG. 5 also represent the output signal from drop and aerosol arrangement 10 after the output signal passes through a high frequency filter.

FIG. 5 is the output signal representative of scattered light 19 collected from 50 liquid drop ejectors 12 operating at 18 KHz. Each curve in the graph represents a different number of drops ejected by each of the 50 liquid drop ejectors. Line 502 is for 10K drops ejected, line 504 is for 20K drops ejected, line 506 is for 60K drops ejected and line 508 is for 80K drops ejected. Time positions F1, F2, F3 and F4 represent when the liquid drop ejectors stop firing for the different total number of drops ejected. F1 is when the 50 liquid drop ejectors stop firing for 10K drops. F2, F3 and F4 correspond to the time when the ejectors stop firing for the 20K, 60K, and 80K drops ejected respectively. FIG. 5 shows the output signals for when the airflow device is producing low or no airflow towards light beam 18.

Time Δt is the time from when the ejectors begin ejecting liquid drops and when the first small drops 32 begin to enter light beam 19. Time Δt is a function of the spacing between the light beam and the drop ejectors and the air flow speed (if any). Times t1, t2, t3 and t4 are when the aerosol has dispersed and there are no more small drops in light beam 19 for each of the curves 502, 504, 506 and 508 respectively. The area under each curve (502, 504, 506 and 508) is a linear function of the total number of drops ejected by each ejector. The area under each curve (502, 504, 506 and 508) is also a linear function of the light beam intensity. The health of one or more liquid drop ejector can be determined using the measured output signal for the aerosol detected. Using the area under the curve a predicted number of drops ejected by the drop ejectors can be determined. When the number of drops predicted correlates with the actual number of drop that should have been ejected, then the drop ejectors are functioning properly. When the predicted number of drops does not correlate with the number of drops that should have been ejected, then one or more of the drop ejectors may not be functioning properly. For example, the drop ejectors may be clogged or the drop ejector may be producing more aerosol than it should for each main drop ejected.

The output signal may also be used to monitor and/or control systems that interact with, or are a part of, the drop dispensing system. For example, the flow rate or rpms of a vacuum aerosol collection system may be controlled using the output signal.

Figure 6:
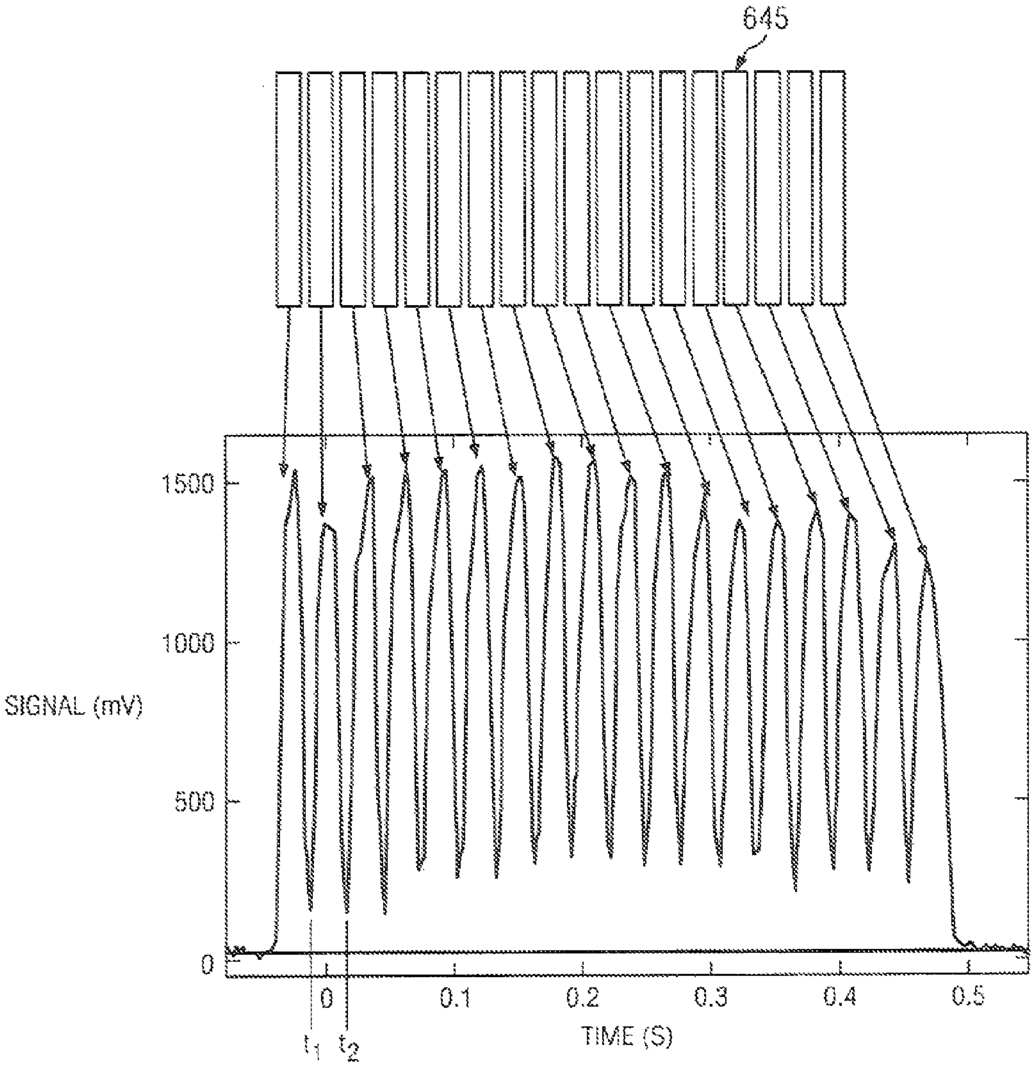
FIG. 6 illustrates output signals representative of scattered light collected in an aerosol arrangement as shown in FIG. 3B in accordance with one embodiment.

FIG. 6 illustrates output signals representative of scattered light 19 collected in an aerosol arrangement 50 as shown in FIGS. 3A and 3B when airflow device 40 is producing a higher air flow rate towards light beam 18. The higher airflow rate moves the smaller liquid drops in the aerosol into and through the light beam 18 at a quicker rate than when airflow device 40 is producing low or no air flow towards light beam 40. In FIG. 6 a plurality of print patches 645 are ejected from a plurality of drop ejectors 12. The light scattered from the aerosol created when each print patch is printed is shown in the corresponding peak in the output signal in FIG. 6. Time t1 is when the light first starts to be scattered from the aerosol created when the second print patch is printed. Time t2 is when the aerosol has dissipated after the second print patch was printed. In FIG. 5 the time between when the aerosol is first detected and when the aerosol has dissipated from the light beam can be up to 7 seconds. In FIG. 6 the time between when the aerosol is first detected and when the aerosol has dissipated from the light beam is much shorter (typically around 0.025 seconds). With the airflow device producing a higher air flow rate, the amount of aerosol produced can be measured with less delay.

Although specific embodiments have been illustrated and described herein, it will be appreciated by those of ordinary skill in the art that a variety of alternate and/or equivalent implementations may be substituted for the specific embodiments shown and described without departing from the scope of the present invention. For example, the drop and aerosol detector arrangement 10 and the aerosol detection arrangement 50 could be used in conjunction with a computer printer, or with any of a variety of drop ejection systems while remaining within the spirit and scope of the present invention. This application is intended to cover any adaptations or variations of the specific embodiments discussed herein. Therefore, it is intended that this invention be limited only by the claims and the equivalents thereof.

What is claimed is:

1. A aerosol detection arrangement comprising:

a light source for projecting a light beam;

a liquid drop ejector for ejecting a plurality of main liquid drops, the liquid drop ejector ejecting smaller liquid drops that form an aerosol in addition to the plurality of main liquid drop;

a light collector for collecting light scattered off the smaller liquid drops in the aerosol and processing the scattered light into an output signal; and a controller for receiving the output signal from the light collector and use the output signal to determine a predicted number of main liquid drops ejected.

2. The drop detection arrangement of claim 1, wherein the controller determines the predicted number of main liquid drops by integrating the intensity of light scattered off of the smaller liquid drops in the aerosol over a time period beginning when the first aerosol enters the light beam and ending when the aerosol has dispersed from the light beam.

3. The drop detection arrangement of claim 1, wherein the light collector is also for collecting light scattered off the plurality of main liquid drops as the plurality of main liquid drops pass through the light beam.

4. The drop detection arrangement of claim 1, wherein the light beam is positioned such that a path of the plurality of main liquid drops ejected from the liquid drop ejector does not pass through the light beam.

5. The drop detection arrangement of claim 4 further comprising:

an airflow device for directing an air current towards the light beam.

6. The drop detection arrangement of claim 5, wherein the air current flows at a rate between zero and 850 feet/minute.

7. The drop detection arrangement of claim 5, wherein airflow device is passive.

8. The drop detection arrangement of claim 4, further comprising:

a second light beam, wherein one light beam is positioned on one side of the path of the plurality of main liquid drops and the second light beam is positioned on the other side of the path of the plurality of main liquid drops.

9. The drop detection arrangement of claim 1, wherein a health of the liquid drop ejector is determined by comparing the predicted number of liquid drops ejected with an expected number of liquid drops ejected.

10. A method, comprising:

measuring an amount of reflected light from small liquid drops in an aerosol to determine an amount of aerosol produced by a liquid drop ejector as the liquid drop ejector ejects a plurality of main liquid drops;

determining a predicted number of main liquid drops ejected using the measured amount of reflected light;

comparing the predicted number of main liquid drops ejected with an expected number of liquid drops ejected to determine a performance measure of the liquid drop ejector.

11. The method of claim 10, wherein the aerosol is produced from a plurality of liquid drop ejectors as each of the plurality of liquid drop ejectors produces at least one main liquid drop.

12. The method of claim 10, wherein the main liquid drops produced by the liquid drop ejector do not pass through a light beam used to illuminate the aerosol.

13. The method of claim 10, further comprising:

forcing the aerosol towards a light beam using a flow of air, wherein the light beam is used to illuminate the small liquid drops in the aerosol to create the reflected light.

14. The method of claim 13, wherein the flow of air moves at a rate between 50 and 250 feet/minute.

15. The method of claim 10, wherein the predicted number of main liquid drops is determined by integrating the intensity of scattered light off of the smaller liquid drops in the aerosol over a time period beginning when the first aerosol enters a light beam and ending when the aerosol has dispersed from the light beam, wherein the light beam is used to illuminate the small liquid drops in the aerosol to create the scattered light.

16. The method of claim 10, further comprising:

controlling a system configured to interact with the aerosol using the determined amount of aerosol produced as a feedback signal.

17. A aerosol detection system, comprising:

means for shaping a light beam;

means for controllably ejecting main droplets;

means for collecting light reflected from small liquid drops in an aerosol as the aerosol passes through the light beam, the aerosol produced when the main droplets are ejected;

means for producing an output signal based on the collected light, the output signal indicative of the amount of aerosol produced;

means for determining a performance measure of the means for controllably ejecting main droplets.

* * * * *